July 26, 1960
A. L. LIND
2,946,939
CURVE FOLLOWER
Filed June 2, 1958
2 Sheets-Sheet 1
Fig-1
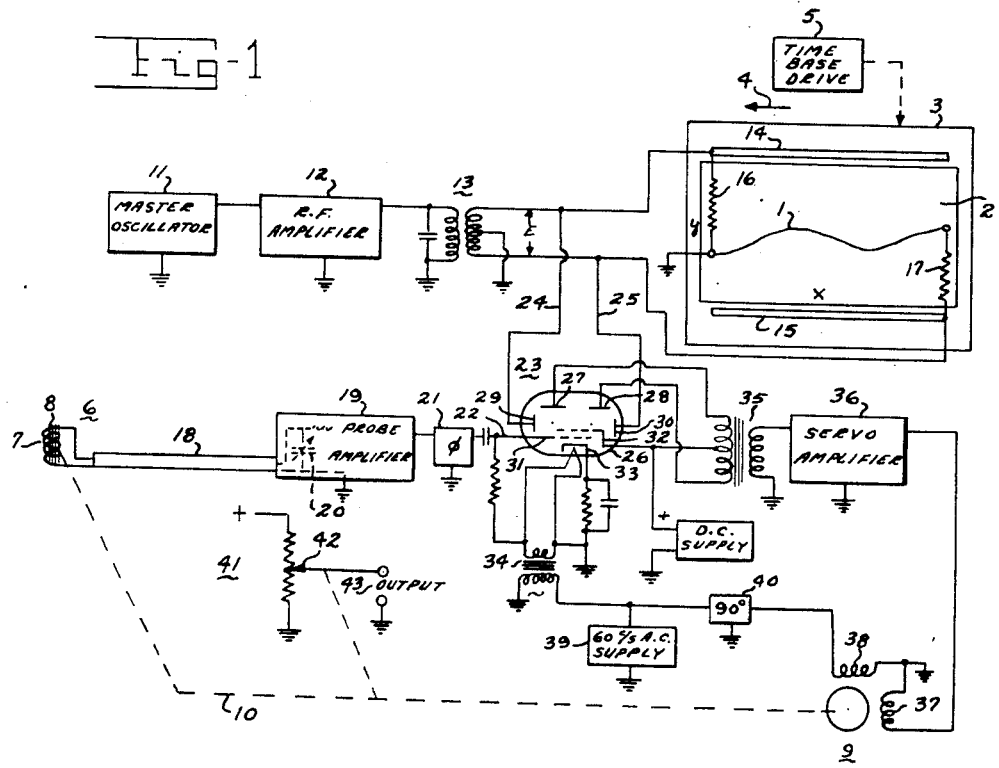
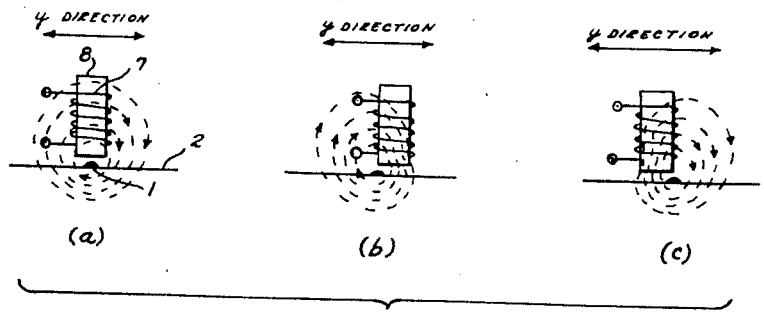
Fig-2
INVENTOR.
ARDEN L. LIND
BY
ATTORNEY
AGENT

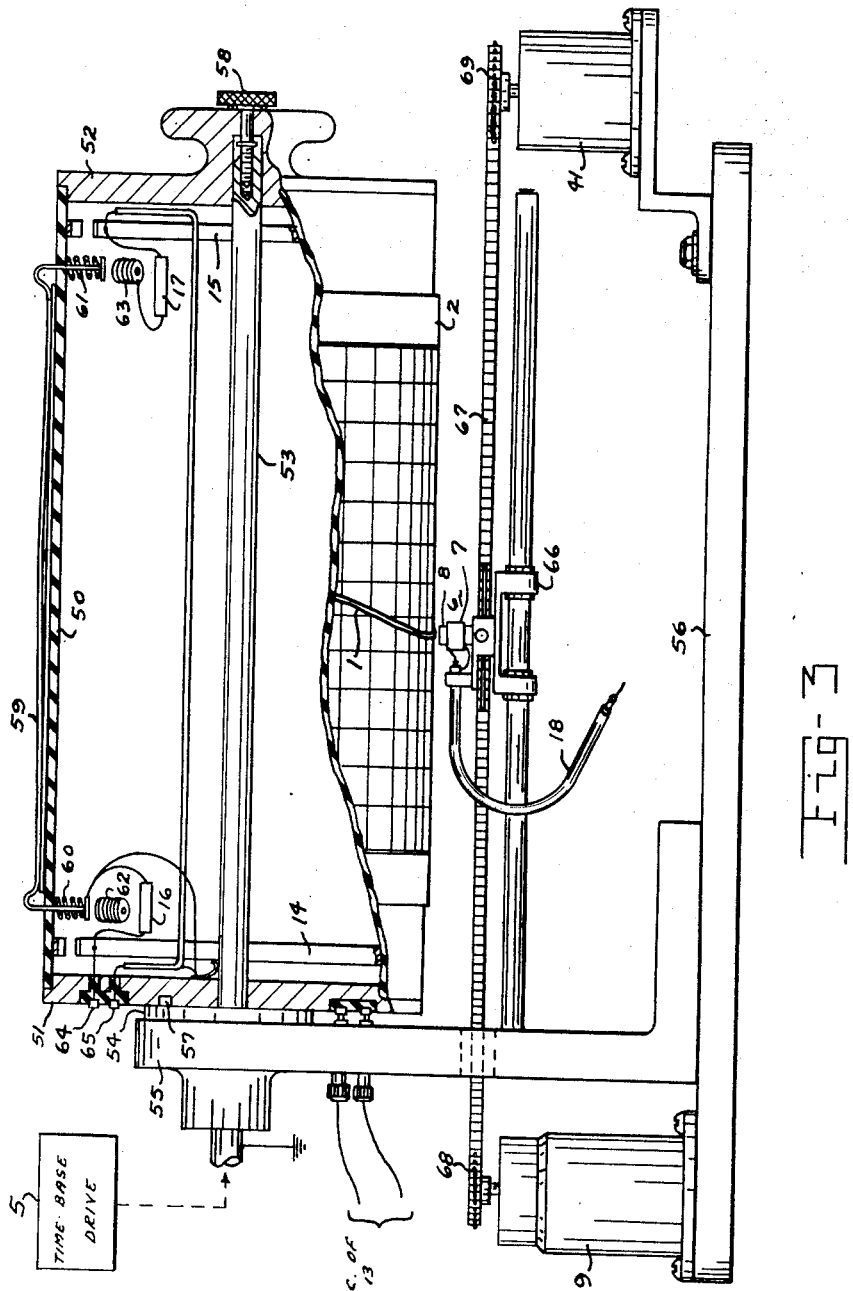

2,946,939
CURVE FOLLOWER

Arden L. Lind, New Brighton, Minn., assignor to the United States of America as represented by the Secretary of the Air Force Filed June 2, 1958, Ser. No. 739,445

5 Claims. (Cl. 318—31)

The purpose of this invention is to provide an electronic curve follower for use in conjunction with electronic computers, etc., and capable of producing a voltage that varies as the ordinate of a curve drawn on a piece of graph paper with conductive ink. The curve follower has a small probe containing a winding in which an error signal is induced by the magnetic flux surrounding the conductive curve when carrying a current. A servo system responds to the error signal to move the probe in the ordinate direction and thus keep it centered over the curve. A further object of the invention is to provide means which cause the probe to seek the curve when positioned beyond the influence of the magnetic field surrounding the curve. This avoids the necessity for manually placing the probe in the vicinity of the curve at the start of a problem.

A more detailed explanation of the invention will be given in connection with the specific embodiment thereof shown in the accompanying drawings in which Fig. 1 is a schematic diagram of the excitation and servo circuits of the curve follower, Fig. 2 illustrates the manner of sensing the probe position relative to the curve, Fig. 3 shows mechanical details of a practical embodiment of the curve follower.

Referring to Fig. 1, a conductive curve 1 is located on the surface of an insulating sheet 2 relative to rectangular coordinate axes $x$ and $y$. The curve may be drawn with conductive ink or paint, such as silver paint, or it may be formed by etching or any of the other known processes. The sheet 2 is attached to subplate 3 which, as will be seen later, may be the surface of a cylinder. The subplate 3 is driven in the direction of the arrow 4, the $x$-direction, at a constant rate, or at a rate that varies as any desired function of time, by time base drive 5. A probe, generally indicated at 6, and having a coil 7 and magnetic core 8, is supported just above the surface 2, with the coil axis preferably normal to the surface, and is movable in the $y$-direction only by servo motor 9 acting through mechanism 10, in a manner more clearly seen in Fig. 3 to be described later.

The curve follower is excited at a frequency in the R.F. range, for example, 455 kc. This frequency is generated by oscillator 11, amplified by 12 and applied to transformer 13 having a center tapped secondary with the center tap connected to a point of reference potential such as ground. The amplification is sufficient to give a comparatively high R.F. voltage E across the secondary winding, for example, 200 volts peak-to-peak. Repelling electrodes 14 and 15, to be explained later, are connected to the secondary winding terminals of transformer 13 so that their voltages are of equal amplitudes relative to ground and of opposite phase. The conductive curve 1 is connected in series with equal resistors 16 and 17 across the secondary of transformer 13 whereby an R.F. current flows in the curve of magnitude determined by the resistor values. A suitable value for these resistors is 5300 ohms. It is evident that the current flowing in the curve passes through zero at the same time that the repelling electrode voltages pass through zero, or in other words, the current cycles are coincident with the voltage cycles. The resistance of the curve should be sufficiently low that no appreciable voltage drop occurs along its length. A point on the conductive curve is connected to ground.

Fig. 2 shows the method by which the position of the probe relative to the conductive curve is sensed. The figure is drawn for an instant in the cycle of the R.F. current in curve 1 when the current is flowing into the paper. The situation where core 8 is centered relative to curve 1 is shown at (a). In this case the flux produced by the current flowing in the conductive curve does not link the turns of coil 7 and no error signal is induced. At (b) the core is displaced to one side of the curve and at (c) an equal displacement to the other side is shown. In these cases equal flux linkages occur and error signals equal in magnitude are produced; however, the fluxes pass through the coil in opposite directions so that the two error voltages are of opposite phase. The servo system distinguishes between these two phase conditions and moves the probe in the direction of the curve until the condition at (a) is established, as indicated by a vanishing error signal.

The above is accomplished as follows: The error signal induced in coil 7 is applied over shielded line 18 to the input of probe amplifier 19. The input of this amplifier contains a condenser 20 for tuning coil 7 to the frequency of oscillator 11, in this case 455 kc. The output of amplifier 19, after being shifted in phase by network 21 for a purpose to be explained presently, is applied to one of the inputs 22 of a phase detector generally indicated at 23. A reference phase derived from the secondary of transformer 13 is also applied to the phase detector over conductors 24 and 25, the voltages on these conductors relative to ground being equal in magnitude and opposite in phase. The phase of the error signal on conductor 22 is made such that it is the same as the phase of the voltage on one of the conductors 24—25 and opposite to the phase on the other conductor. Considering what is required to establish this phase condition, it will be noted that the current in conductive curve 1 is in phase with the voltage E. Therefore, the surrounding flux produced by this current is also in phase with E. However, the voltage induced in coil 7 is 90° displaced from the flux phase and from the phase of E depending upon the direction of the error. As a result, in order to attain the required 0°–180° relationship between the error signal on conductor 22 and the voltages on conductors 24—25, it is necessary to introduce an additional 90° phase shift in the system. This may be accomplished in the coupling networks of amplifier 19, or in phase shifting network 21, or partly in both.

The phase detector shown is of the gated beam tube type employing a 6AR8 beam tube 26. This tube contains two anodes 27 and 28, two beam deflecting electrodes 29 and 30, a control grid 31, a screen grid 32 and a cathode 33. The reference signal is applied to deflecting electrodes 29 and 30 by conductors 24 and 25, and the error signal is applied to control grid 31 over conductor 22. A 60 c./s. voltage derived from the secondary of cathode heater transformer 34 is also applied between control grid 31 and cathode 33 and produces a 60 c./s. amplitude modulation of the electron beam. The operation of phase detectors of this type is well known. Briefly, when electrode 29 is positive relative to electrode 30, the beam is deflected to anode 27 and away from anode 28. On the next half cycle of the reference signal, when electrode 30 is positive relative to electrode 29, the beam is deflected to anode 28 and away from anode 27. These deflections are equal since the cathode 33 is at the same R.F. potential as the center of the secondary of transformer 13 and therefore the R.F. potentials on electrodes 29 and 30 are of equal magnitudes relative to the cathode. Assuming zero error signal, the currents in anodes 27 and 28 are equal and the 60 c./s. modulations cancel in the center tapped primary of output transformer 35 so that no voltage appears across the secondary of this transformer. In the presence of an error signal, however, the currents to anodes 27 and 28 are not equal and an output will occur from transformer 35 having a magnitude proportional to the magnitude of the error signal and one of two opposite phases depending upon the phase of the error signal relative to the phase of the reference signal. The process by which this output is produced is as follows: The error signal amplitude modulates the electron beam at, in this case, 455 kc. As stated above, the error signal is always in phase with or 180° out of phase with the reference signal. Assuming the error signal on grid 31 to be in phase with the R.F. voltage on electrode 29 and opposite in phase to the R.F. voltage on electrode 30, the current to anode 27 will exceed that to anode 28 since the beam intensity will be greater where it impinges on anode 27. On the other hand, when the error signal is in phase with the signal on electrode 30 the current to anode 28 will exceed that to anode 27. A difference in anode currents produces a net 60 c./s. output at the secondary of transformer 35 the phase of which depends upon the error signal phase. After amplification in servo amplifier 36 the 60 c./s. phase detector output is applied to winding 37 of two-phase servo motor 9. The other winding 38 of this motor is energized from A.C. supply 39. Phase shifter 40 produces the required 90° phase relation between the two windings.

The phasing of the above system is such that an error signal causes the servo motor to run in such direction as to drive the probe 6 toward the conductive curve. When the probe is centered over the curve the error signal becomes zero and energization of motor winding 37 ceases stopping the motor. The driving mechanism 10 is also coupled to a potentiometer 41 for moving its contact 42 in proportion to movement of the probe in the ordinate or y-axis direction thus producing a direct voltage at output terminals 43 proportional to the ordinate of the curve.

The system of Fig. 1 contains means for causing the probe to seek the conductive curve 1 from any position on the surface 2. The strength of the magnetic field surrounding the conductive curve is inversely proportional to the distance from the curve. Ordinarily the strength of this field is inadequate in the more remote areas of the sheet 2 to induce an error signal in the probe coil capable of operating the servo system. This requires that the probe be manually placed near the curve. In order to make this unnecessary there are provided two repelling electrodes 14 and 15 extending on either side of the curve along the edges of sheet 2 and parallel to the x-axis. These electrodes are connected directly to the outer terminals of the secondary of transformer 13 and operate to set up oppositely phased R.F. electric fields, and their necessarily accompanying magnetic fields, between themselves and ground. These fields are capable of inducing R.F. voltages in coil 7 of the probe. By proper choice of the direction of current flow in conductive curve 1, which direction is determined by the polarity of the connections between resistors 16—17 and the secondary terminals of transformer 13, the phase of the voltage induced in the coil 7 by electrode 14 may be made the same as the phase of the voltage induced by the magnetic field surrounding the curve when the probe is in the area between electrode 14 and the curve, and the phase of the voltage induced in the coil by electrode 15 may be made the same as the phase of the voltage induced by the magnetic field surrounding the curve when the probe is in the area between electrode 15 and the curve. The effect of electrodes 14 and 15 therefore is to repel the probe and by suitable choice of the magnitudes of E and the current in the conductive curve, the latter being determined by the values of resistors 16 and 17, the probe can be made to move toward the curve from any point in the area of the sheet of graph paper 2. When the position of the probe is such that core 8 is directly above the conductive curve the effect of the magnetic field surrounding the curve is great compared to the effect of either of the repelling electrodes so that displacement of the zero error signal position of the probe relative to the curve due to the repelling electrodes is negligible. The electrodes 14 and 15 are spaced away from the edge of the sheet 2 to minimize any interaction of the electrostatic and electromagnetic fields if the curve is drawn near the edge of the sheet.

Fig. 3 shows details of a practical embodiment of the mechanical part of the curve follower. A sheet of graph paper 2 on which the curve 1 is drawn with conductive ink is mounted on a cylinder made up of a hollow cylindrical member 50 of insulating material and metal end plates 51 and 52. Member 50 is analogous to subplate 3 of Fig. 1. The cylinder fits over and is supported by a shaft 53 having a flange 54 and journaled in a standard 55 mounted on base plate 56. Aligning and driving pin 57 locks the cylinder to the shaft in a fixed angular position. The cylinder may be held on the shaft and against flange 54 by any suitable means such as locking bolt 58. Shaft 53 is driven by the time base drive 5.

The paper is held on the cylinder near its ends by bail 59, which is urged toward the surface of the cylinder by springs 60 and 61, and by a second similar bail the springs 62 and 63 of which are visible in the drawing. In addition to holding the paper, these bails also serve to make electrical contact to the ends of the curves. For this purpose, the bails may be silver plated and may be normally slightly bowed toward the cylinder so as to insure good contact with the slightly raised conductive curve. Repelling electrodes 14 and 15 may be applied to the inside of the hollow cylindrical member 50. The R.F. leads from the secondary of transformer 13 (Fig. 1) reach the cylinder through brushes mounted in the standard 55 and contacting slip rings 64 and 65 carried by end plate 51. Each of the slip rings is connected directly to one of the repelling electrodes and thence through a resistor, 16 or 17, to one of the bails which make electrical contact with the curve. The lead between slip ring 65 and repelling electrode 15 may have a grounded shield if necessary to reduce its influence on the probe.

The probe 6, consisting of coil 7 and core 8, is attached to a carriage 66 which is slidably supported by a pair of rods, only one of which is visible, extending from standard 55. Shielded lead 18 connects coil 7 to the input of the probe amplifier 19 (Fig. 1). An endless chain 67 is attached at one point to carriage 66 and passes around sprocket wheels 68 and 69 on the shafts of servo motor 9 and potentiometer 41. Consequently, as the servo motor moves carriage 66 to keep the probe centered over the conductive curve in the manner already described, there occurs a proportionate movement of potentiometer 41.

I claim:
1. Apparatus for following an electrically conductive curve located on a rectangular surface with respect to x and y rectangular coordinate axes, said apparatus comprising: a probe having a coil positioned close to said surface with its axis normal to said surface; means for producing relative motion between said curve and said probe in the direction of said x-axis; a servo system for producing relative motion between said curve and said probe in the direction of said y-axis; a pair of narrow repelling electrodes on opposite sides of said curve, situated near the boundary of said surface and parallel to said x-axis; means for applying alternating voltages of equal amplitude and opposite phase between said repelling electrodes and a point of reference potential; means for connecting a point on said curve to said point of reference potential; means for sending an alternating current through said curve of the same frequency as said alternating voltages and passing through zero at the same time as said alternating voltages, the direction of said current at any instant being such that the voltage induced in said coil when it is on either side of said curve by the fields produced by said current and the voltage of the repelling electrode on the same side are additive; and means for applying the total voltage induced in said coil to said servo system as an error signal.

2. Apparatus for following an electrically conductive curve located on a rectangular surface with respect to $x$ and $y$ rectangular coordinate axes, said apparatus comprising: a probe having a coil positioned close to said surface with its axis normal to said surface; means for producing relative motion between said curve and said probe in the direction of said $x$-axis; a servo system for producing relative motion between said curve and said probe in the direction of said $y$-axis; a pair of narrow repelling electrodes on opposite sides of said curve, situated near the boundary of said surface and parallel to said $x$-axis; means for applying alternating voltages of equal amplitude and opposite phase between points on said repelling electrodes and a point of reference potential; means connecting the ends of said conductive curve through equal resistors to said points on said repelling electrodes whereby an alternating current flows in said curve, the polarity of these connections being such that the voltage induced in said coil when it is on either side of said curve by the fields produced by said current and the voltage of the repelling electrode on the same side are additive; and means for applying the total voltage induced in said coil to said servo system as an error signal.

3. Apparatus for following an electrically conductive curve of low resistance located on a rectangular surface with respect to $x$ and $y$ rectangular coordinate axes, said apparatus comprising: a probe having a coil positioned close to said surface with its axis normal to said surface; means for producing relative motion between said curve and said probe in the direction of said $x$-axis; a servo system for producing relative motion between said curve and said probe in the direction of said $y$-axis; a pair of narrow repelling electrodes on opposite sides of said curve, situated near the boundary of said surface and parallel to said $x$-axis; means for applying alternating voltages of equal amplitude and opposite phase between points on said repelling electrodes and a point of reference potential; means connecting the ends of said conductive curve through equal resistors to said points on said repelling electrodes whereby an alternating current flows in said curve, the polarity of these connections being such that the voltage induced in said coil when it is on either side of said curve by the fields produced by said current and the voltage of the repelling electrode on the same side are additive; means for connecting a point on said curve to said point of reference potential; and means for applying the total voltage induced in said coil to said servo system as an error signal.

4. Apparatus as claimed in claim 3 in which the frequency of said alternating voltage is a radio frequency.

5. Apparatus as claimed in claim 3 in which means coupled to said probe are provided for producing a voltage proportional to the ordinate of said curve measured along the $y$-axis.

References Cited in the file of this patent
UNITED STATES PATENTS

| | | |
|---|---|---|
| 2,499,178 | Berry et al. | Feb. 28, 1950 |
| 2,588,386 | Hubbard et al. | Mar. 11, 1952 |
| 2,835,858 | Moseley | May 20, 1958 |